(12) United States Patent
Oteman et al.

(10) Patent No.: US 8,076,877 B2
(45) Date of Patent: Dec. 13, 2011

(54) SYSTEM AND METHOD FOR CONTROLLING POWER BALANCE IN AN ELECTRICAL/MECHANICAL SYSTEM

(76) Inventors: David G. Oteman, Racine, WI (US); James A. Parison, New Ipswich, NH (US); Lawrence D. Knox, Hopkinton, MA (US)

(*) Notice: Subject to any disclaimer, the term of this patent is extended or adjusted under 35 U.S.C. 154(b) by 546 days.

(21) Appl. No.: 12/253,859

(22) Filed: Oct. 17, 2008

(65) Prior Publication Data
US 2010/0097017 A1    Apr. 22, 2010

(51) Int. Cl.
*H02P 3/14*    (2006.01)
(52) U.S. Cl. ............ 318/376; 318/400.02; 318/400.14; 318/400.31
(58) Field of Classification Search ............ 318/400.02, 318/400.14, 400.38, 376, 400.31; 180/65.1, 180/65.3, 65.5, 65.6, 65.8
See application file for complete search history.

(56) References Cited

U.S. PATENT DOCUMENTS

| | | | |
|---|---|---|---|
| 3,806,785 A * | 4/1974 | DeValroger et al. ....... 318/400.2 |
| 5,027,048 A | 6/1991 | Masrur et al. |
| 6,384,567 B1 * | 5/2002 | Maeda .......................... 318/801 |
| 6,800,966 B2 | 10/2004 | Godkin |
| 6,949,945 B2 * | 9/2005 | Klein ............................ 374/185 |
| 6,954,045 B2 * | 10/2005 | Nishikawa et al. ............ 318/376 |
| 6,989,644 B2 * | 1/2006 | Kim .......................... 318/400.31 |
| 7,015,663 B1 | 3/2006 | Tzeng et al. |
| 7,015,667 B2 * | 3/2006 | Patel et al. ..................... 318/432 |
| 7,034,482 B2 * | 4/2006 | Komiyama et al. ........... 318/376 |
| 7,202,577 B2 | 4/2007 | Parison et al. |
| 7,245,104 B2 * | 7/2007 | Tomigashi et al. ........... 318/705 |
| 7,332,837 B2 * | 2/2008 | Ward et al. ...................... 310/54 |
| 7,592,766 B2 * | 9/2009 | Patel et al. ............... 318/400.02 |
| 2005/0035678 A1 * | 2/2005 | Ward et al. ............... 310/156.37 |
| 2006/0095180 A1 | 5/2006 | Ummethala et al. |
| 2007/0290637 A1 | 12/2007 | Sepe |

OTHER PUBLICATIONS

International Search Report and Written Opinion dated Mar. 4, 2010 for PCT/US2009/060821.

* cited by examiner

*Primary Examiner* — Walter Benson
*Assistant Examiner* — Thai Dinh (57) ABSTRACT

An electrically commutated actuator and control system has a stator and a shaft that is movable with respect to the stator. A plurality of magnets movable with the shaft provide a first magnetic flux, and an electric current in at least one coil defined on the stator provides a second magnetic flux. The second magnetic flux is controlled in response to the first input so that the second magnetic flux has a predetermined phase with respect to the first magnetic flux. The second magnetic flux is controlled in response to the second input so that the phase of the second magnetic flux with respect to the first magnetic flux varies from the predetermined phase.

19 Claims, 6 Drawing Sheets

SYSTEM AND METHOD FOR CONTROLLING POWER BALANCE IN AN ELECTRICAL/MECHANICAL SYSTEM

BACKGROUND OF THE INVENTION

Figure 1:
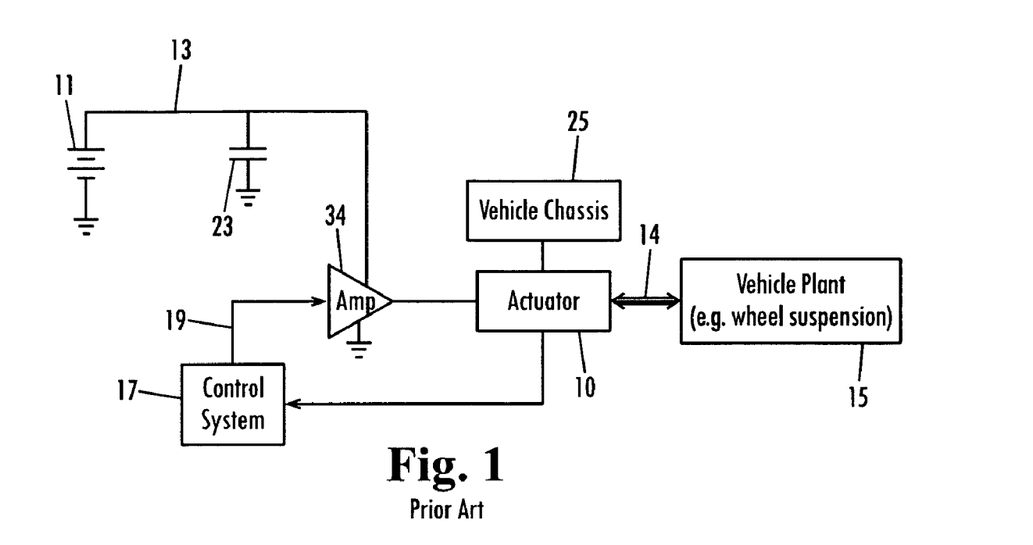
FIG. 1 is a schematic diagram of a prior art suspension actuator system.
Figure 2:
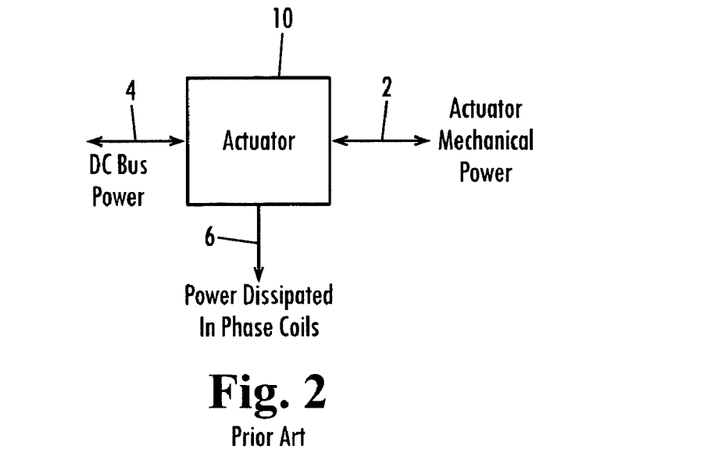
FIG. 2 is a schematic power flow diagram of a prior art suspension actuator system.

The present specification describes electrical/mechanical systems having at least a three point power interface. Referring to FIGS. 1 and 2, an example of such a system comprises one or more linear actuator systems 10 supplied with AC power from an amplifier 34 which is powered by a direct current (DC) power source, for example a battery 11. As described in more detail below, actuator system 10 comprises stator having a set of coil windings and a shaft. The shaft may be a plunger having a set of permanent magnets. A control system defines an electric current pattern to apply to the coil windings to thereby define a magnetic flux density across a gap between the coil windings and a series of magnets on the shaft, thereby generating a force to move the shaft for a moving magnet linear actuator. The shaft's movement with respect to the coils defines an actuator mechanical power, indicated at 2. Power applied to the coils by battery 11 over a DC bus 13 is indicated at 4, and dissipated power (comprised of power dissipated in the coils, core loss in the motor and power electronics loss in the amplifier) is indicated at 6. Power flows 2, 4 and 6 define a three point power interface between actuator system 10 and the world outside the actuator.

As should be understood, the power across the three point power interface must sum to zero, i.e. the power flowing into the actuator system must balance with the power flowing out. As indicated in FIG. 2 and described in more detail below, dissipated power 6 always flows out of the actuator system, whereas each of actuator mechanical power 2 and DC bus power 4 can flow into or out of the actuator system. If a mechanical event occurs that causes a power flow into the actuator that is greater than the dissipated power out of the actuator system, then DC bus power 4 flows out of the actuator onto the DC bus. This is referred to herein as a regeneration event. As should be understood, regeneration can have the effect of applying electric-current back to, and thereby recharging, battery 11 but can damage the battery if the regeneration current is sufficiently high.

SUMMARY OF THE INVENTION

In one embodiment of a method of controlling a commutated actuator having a stator, a shaft that is movable with respect to the stator at an interface between the stator and the shaft, a plurality of magnets movable with the shaft and disposed with respect to the interface so that the plurality of magnets provide a first magnetic flux that varies in magnitude and direction along the interface, and at least one coil defined on the stator with respect to the interface so that an electric current applied to the at least one coil provides a second magnetic flux that varies in magnitude and direction along the interface responsively to variations in the electric current, a first input and a second input are received. In response to the first input, the second magnetic flux is controlled so that the second magnetic flux has a predetermined phase with respect to the first magnetic flux. In response to the second input, and variably with respect to the first input, the second magnetic flux is controlled so that phase of the second magnetic flux with respect to the first magnetic flux shifts from the predetermined phase.

In another embodiment of a method of controlling a commutated actuator having a stator, a shaft that is movable with respect to the stator at an interface between the stator and the shaft, a plurality of magnets movable with the shaft and disposed with respect to the interface so that the plurality of magnets provide a first magnetic flux that varies in magnitude and direction along the interface, at least one coil disposed on the stator with respect to the interface so that an electric current applied on the at least one coil provides a second magnetic flux that varies in magnitude and direction along the interface responsively to variations in the electric current, and a battery having a voltage, a voltage is applied across the at least one coil at a variable level. A relative position between the shaft and the stator is determined. First and second inputs are received. The variable level is controlled responsively to the relative position and the first input to provide a q-axis component of the electric current on the at least one coil with respect to the first magnetic flux and the second magnetic flux. The variable level is controlled responsively to the second input to provide a d-axis component of the electric current on the at least one coil with respect to the first magnetic flux and the second magnetic flux.

In another embodiment, an electrically commutated actuator and control system comprises a stator and a shaft that is movable with respect to the stator at an interface between the stator and shaft. A plurality of magnets is movable with the shaft. The plurality of magnets are disposed with respect to the interface so that the plurality of magnets provide a first magnetic flux that varies in magnitude and direction along the interface. At least one coil is disposed on the stator with respect to the interface so that an electric current on the at least one coil provides a second magnetic flux that varies in magnitude and direction along the interface responsively to variations in the electric current. A variable amplifier applies a varying electric current on the at least one coil that comprises a q-axis component with respect to the first magnetic flux and the second magnetic flux and a d-axis component with respect to the first magnetic flux and the second magnetic flux. A control circuit defines the q-axis component in response to a first input and defines the d-axis component in response to a second input variably with respect to the q-axis component.

In a still further embodiment, a plant in a vehicle and control system for actively suspending the plant in the vehicle comprises a plant that varies in position with respect to the vehicle in response to force applied by or to the vehicle. An electrically commutated actuator comprises a stator and a shaft that is movable with respect to the stator at an interface between the stator and the shaft. A plurality of magnets is movable with the shaft. The plurality of magnets is disposed with respect to the interface so that the plurality of magnets provides a first magnetic flux that varies in magnitude and direction along the interface. At least one coil is disposed on the stator with respect to the interface so that an electric current on the at least one coil provides a second magnetic flux that varies in magnitude and direction along the interface responsively to variations in the electric current. The shaft is in mechanical communication with the plant so that force is applied between the plant and the at least one coil via the shaft. A variable amplifier applies a varying electric current on the at least one coil that comprises a q-axis component with respect to the first magnetic flux and the second magnetic flux and a d-axis component of with respect to the first magnetic flux and the second magnetic flux. A control circuit defines the q-axis component in response to a first input and defines the d-axis component in response to a second input variably with respect to the q-axis component.

BRIEF DESCRIPTION OF DRAWINGS

A full and enabling disclosure of the present invention, including the best mode thereof to one of ordinary skill in the art, is set forth more particularly in the remainder of the specification, which makes reference to the accompanying figures, in which.

Repeat use of reference characters in the present specification and drawings is intended to represent same or analogous features or elements of the invention.

DETAILED DESCRIPTION

Reference will now be made in detail to certain embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations that come within the scope of the present disclosure, including the appended claims.

Figure 3:
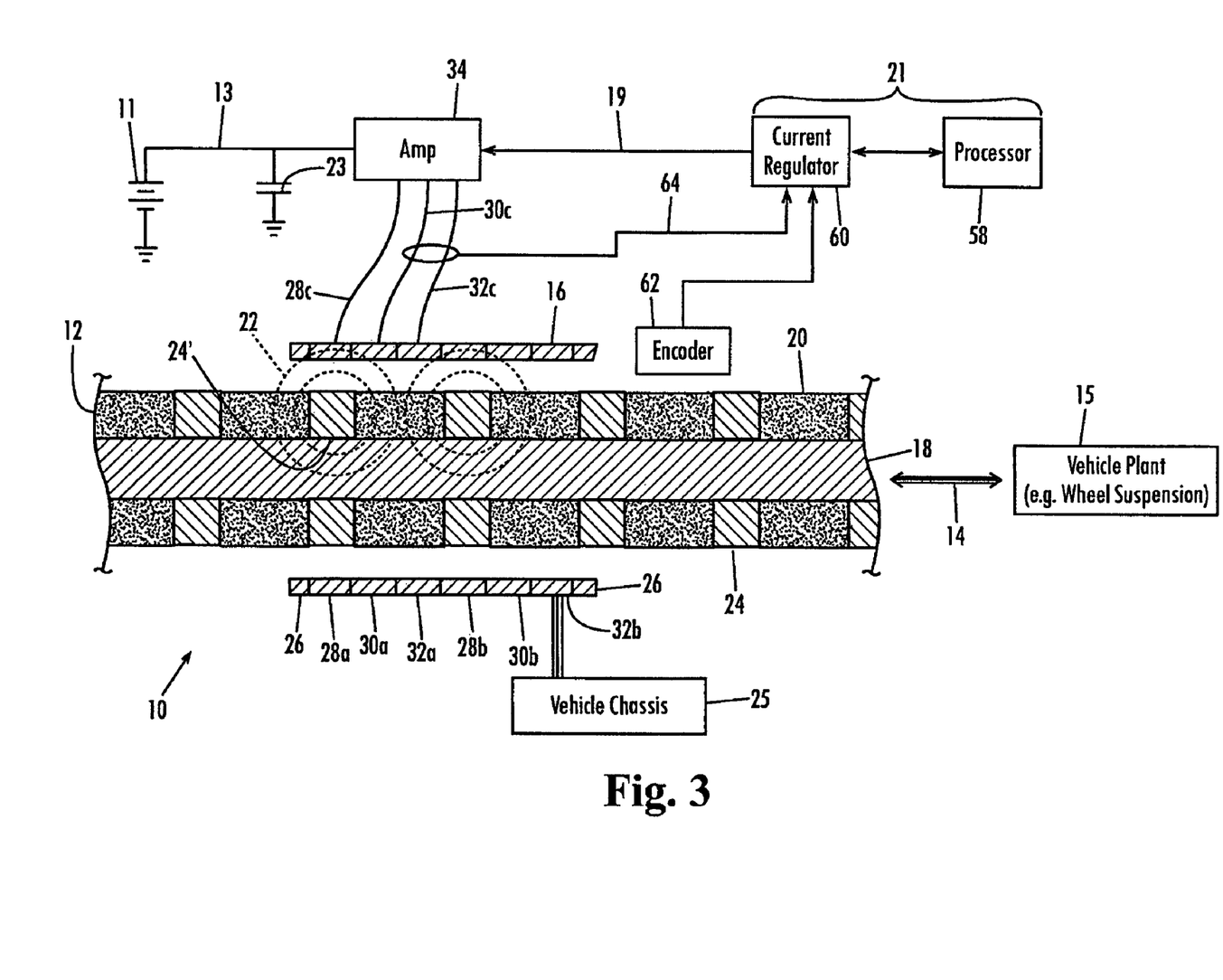
FIG. 3 is a schematic block diagram illustration of an actuator system in accordance with an embodiment of the present invention.

While the embodiments presented in this specification are described in the context of a linear actuator, it should be understood that this is for purposes of example only, and one skilled in the art should understand from the present disclosure that systems and methods as described herein may be implemented using other electrical/mechanical devices and arrangements. Thus, for example, while the actuator discussed herein is a linear actuator, and the shaft is a linear plunger, it should be understood that the actuator may be a rotary motor, and the shaft may rotate, or may effect a nut/threaded screw action, in response to force rather than move directly linearly. Referring to FIG. 3, linear actuator 10 may comprise a stator 16 and a shaft, in this example a plunger 12, reciprocally linearly movable in an axial direction 14 with respect to stator 16. Arrow 14 is presented in bold in FIG. 3 (and in FIG. 1) to indicate a direct mechanical connection, in this instance (for example) between plunger 12 and a vehicle suspension 15 such that plunger 12 and vehicle suspension 15 move together in the reciprocal direction indicated at 14. Stator 16 may be fixed to an actuator housing (not shown) that surrounds the plunger and the stator and that is fixed to vehicle chassis 25, as indicated by the bold line in FIG. 3 (and in FIG. 1) between the actuator and the vehicle chassis. As described below, plunger 12 and stator 16 may be arranged in a two pole configuration, although it should be understood that this is for purposes of explanation only and that four pole and higher order arrangements could be employed. Plunger 12 may be comprised of a non-magnetic rod 18 and axially magnetized cylindrical permanent magnets 20 that are secured about the plunger and that alternate in polarity along direction 14, resulting in flux lines 22. The plunger may also include cylindrical pole pieces 24 between the magnets. In another embodiment, the actuator is a double-sided linear motor, and the plunger is comprised of rectangular pole pieces 24 and rectangular permanent magnets 20 that are magnetized so that an air gap flux density is perpendicular to a line defined by the air gap. While a moving magnet linear actuator is described in the example, it should be understood that this is for purposes of example only, and one skilled in the art should understand from the present disclosure that systems and methods as described herein may be implemented using an actuator having a stator with at least one coil and a shaft with at least one permanent magnet, the stator and the shaft moving relative to each other (moving coil or moving magnet) in a linear or rotary fashion. While a three phase actuator is described in the example, one skilled in the art should understand from the present disclosure that systems and methods as described herein may be implemented using different number of actuator phases, for example 2-phase, 4-phase etc.

Stator 16 may be comprised of a pair of non-magnetic cylindrical base rings 26 and a three-phase winding of six coils 28a, 30a, 32a, 28b, 30b and 32b. As should be well understood, the coils in each pair of windings 28a/28b, 30a/30b and 32a/32b may be wound and electrically connected to each other so that the magnetic flux produced by the two coils in response to an alternating (AC) electric current delivered to the coils by a respective wire 28c, 30c or 32c from an inverter 34 reinforces between the two coils. From DC power source 11 over a DC bus 13, inverter 34 may derive three AC current signals, each being 120° electrically out of phase with each of the other two signals, and apply the signals respectively to wires 28c, 30c and 32c. More specifically, in the illustrated example, if the stator is activated to move plunger 12 to the right (in the view shown in FIG. 3), the signal on line 30c lags the signal on line 28c by 120°, and the signal on line 32c lags the signal on line 30c by 120°, whereas if the stator coils are activated to move plunger 12 to the left, the signal on line 30c leads the signal on line 28c by 120°, and the signal on line 32c leads the signal on line 30c by 120°.

Figure 4:
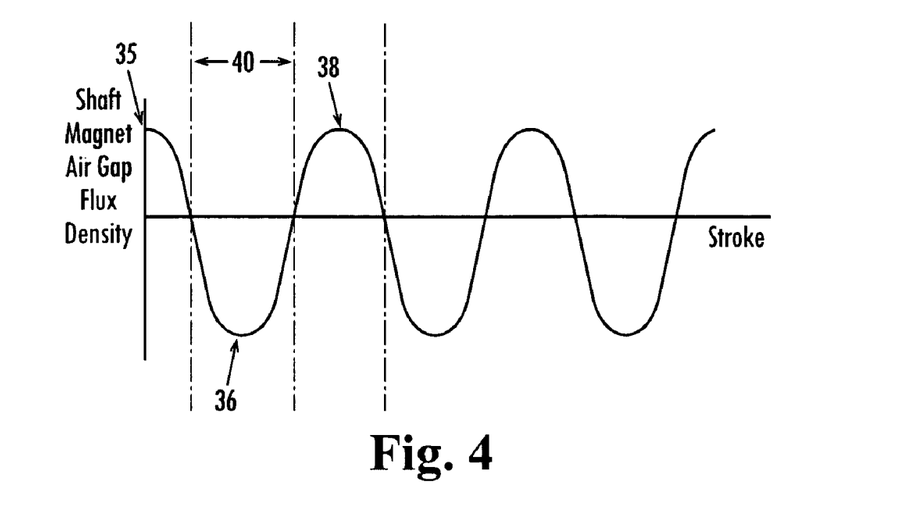
FIG. 4 is a waveform diagram of a magnetic flux density exhibited by the system as shown in FIG. 3.

FIG. 4 illustrates the air gap flux density contributed by the plunger's permanent magnets in the gap between the stator and the plunger at a point aligned with a given point at the stator, e.g. at winding 28a, as plunger 12 moves in either axial direction 14 with respect to the stator. Point 35 in FIG. 4 represents the air gap flux density at stator winding 28a in its position shown in FIG. 3. At 36, plunger 12 has moved in one of the directions 14 so that winding 28a directly opposes the next occurring pole piece 24, and at 38, plunger 12 has continued its movement so that winding 28a directly opposes the second occurring pole piece. Thus, the pole pitch of the permanent magnets on plunger 12 is indicated at 40.

Figure 5:
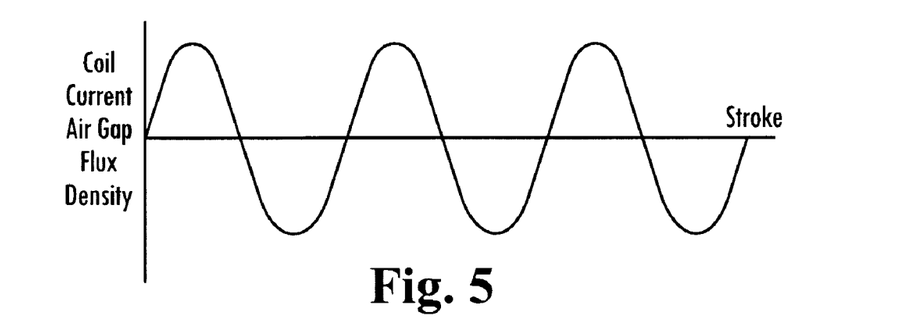
FIG. 5 is a waveform diagram of a magnetic flux density exhibited by the system as in FIG. 3.

FIG. 5 illustrates the air gap magnetic flux density contributed by winding 28a in the gap between the stator and the plunger at a point aligned with a given point at the plunger, e.g. at pole piece 24', as plunger 12 moves in the same axial direction as reflected by the flux density curve shown in FIG. 4. As described in more detail below, the system may comprise a linear encoder 62 and control system 21, so that the linear encoder detects the position of plunger 12 relative to stator 16 and provides the plunger's relative position to control system 21 that determines amplitudes of "d-axis" and "q-axis" components of the current signal, or in another embodiment the amplitude and relative phase (i.e. a phase shift from the q-axis phase) of the current signal, over line 28c that results from a varying voltage signal inverter 34 applies to coil 28a. As indicated by comparison of FIGS. 4 and 5, control system 21 may control a current signal on coil 28a that produces an air gap flux density curve relative to the moving plunger 12 having the same sine wave shape as the FIG. 4 curve, but in this instance offset by 90° in phase. As should be understood in this art, the 90° phase offset current signal at coil 28a (and, therefore, also coil 28b) results in the most efficient application of magnetic force from coil 28a to moving plunger 12 in direction 14 in ideal circumstances. As should also be understood, however, the most efficient phase shift in coil current to an actual motor/linear actuator may be somewhat different from 90°. Methods for calibrating actuator coil current should be well understood and are, therefore, not described herein. Thus, it should be understood that for any given permanent magnet actuator, whether a rotary motor or a linear actuator, there is a positional phase shift (between a curve defined by the air gap flux density contributed by the permanent magnets with respect to the stator when the magnets and stator are moving relative to each other and a curve defined by the air gap flux density contributed by the stator coil with respect to the permanent magnets during the relative movement) that results in the most efficient application of force between the stator and the magnets. Electric current applied to the actuator coils at such a phase (i.e. electrical phase) that produces this phase shift (i.e. positional phase) between the magnetic flux density curves is known as "q-axis" current. For purposes of explanation only, ideal conditions are assumed in FIGS. 4 and 5, and the exemplary positional q-axis phase described herein is, therefore, at the 90° phase shift indicated at FIG. 5 relative to FIG. 4, but it should be understood that for a given actuator, the actual q-axis phase may differ from 90° according to known principles and methods. As should be understood, q-axis phase is typically defined for a given motor design and then assumed to be at that rated value for all subsequent motors of that type, even if q-axis phase could be more precisely defined for a given individual motor. Such methods of defining q-axis phase are encompassed within the present disclosure.

The force ($F_{out}$) between plunger 12 and stator 16 due to flow of electric current in the coils is given by the equation:

$$F_{out}=ia(x)*Kfa(x)+ib(x)*Kfb(x)+ic(x)*Kfc(x), \text{ where}$$

ia(x): electric current signal on coils 28a and 28b
Kfa(x): phase force constant for winding 28a/28b
ib(x): electric current signal on coils 30a and 30b
Kfb(x): phase force constant for winding 30a/30b
ic(x): electric current signal on coils 32a and 32b
Kfc(x): phase force constant for winding 32a/32b
x: position of plunger 12 with respect to stator 16 along axial direction 14.

As explained above, each current signal ia(x), ib(x) and ic(x) is controlled so that the coils receiving the electric current signal create an air gap magnetic flux density (relative to the plunger) that defines a curve with the same shape as the air gap magnetic flux density curve defined by the plunger's permanent magnets that the respective coils see as the plunger and stator move relative to each other, but shifted 90° (if at the positional q-axis phase under the ideal assumption noted above) in phase from the permanent magnet flux curve. Since the coils and the permanent magnets are arranged so that the respective air gap magnetic flux curves seen from the plunger by coil pairs 28a/28b, 30a/30b and 32a/32b are offset from each other by 120°, current signals ia(x), ib(x) and ic(x) are separated from each other in phase by 120°, each being offset in phase 90° from its respective air gap magnetic flux curve from the plunger. As indicated above, the air gap magnetic flux curves form sine waves, and the current signal ia(x) controlled on coils 28a/28b can be described by the equation:

$$ia(x)=Ia*\sin(2*pi*x/(2*mp))+\text{phase\_shift, where}$$

Ia: maximum amplitude of current ia(x)
x: relative position of plunger 12 with respect to coils 28a/28b along axial direction 14
mp: magnet, or pole, pitch 40
phase_shift: phase shift from the electrical q-axis phase that results in the positional q-axis phase of the resulting air gap magnetic flux density curve (phase_shift is zero in the curve shown in FIG. 5).

Ia is defined by the control system (either directly or through definition of the magnitudes of the component q-axis and d-axis currents) to apply a desired force to the plunger, as described below. The equations for ib(x) and ic(x) are similar to the ia(x) equation and are therefore not presented. Note that "x" is the relative position between the plunger and the respective coils. Relative position "x" may be considered the distance in the axial direction between arbitrarily chosen points on the plunger and one of the coils that are in alignment (i.e. x=0) when current ia(x) on coil pair 28a/28b is at a maximum on a curve that describes a q-axis current when phase_shift is zero. Note also that the equations for the current for the other two coils respectively offset the "2*pi*x/(2*mp)" term by 120° and 240° to thereby describe the three-phase 120 offsets among the current signals. For any relative position "x" between the plunger and the stator, the current functions ia(x), ib(x) and ic(x) define the current that should be controlled on the respective coil pairs to apply a desired force. If the plunger and stator are moving with respect to each other, the current signals will vary according to their sinusoidal functions, but if the plunger and stator are fixed in position relative to each other, a constant current will be applied, as defined by the current functions. The actual current functions depend on the commutation scheme. For example a trapezoidal commutation will result in actual current functions that are different from ideal sinusoidal functions, and sinusoidal functions are described herein for purposes of explanation.

The phase force constant Kfa(x) is determined by the actuator's magnetic design and has units of Newtons/Ampere. The phase force constant is preferably a sine wave or similar to a sine wave, although the function can become more complicated at high current levels. For normal electric current levels (i.e. when the actuator back iron is not heavily saturated, as should be well understood), and in the ideal conditions as noted above, the respective phase force constants for coil pairs 28a/28b, 30a/30b and 32a/32b are defined by the equations:

$$Kfa(x)=KF_A*\sin(2*pi*x/(2*mp))$$

$$Kfb(x)=KF_B*\sin(2*pi*x/(2*mp)-2*pi/3)$$

$$Kfc(x)=KF_C*\sin(2*pi*x/(2*mp)-4*pi/3), \text{ where}$$

x: relative positions of plunger 12 with respect to coil pairs 28a/28b, 30a/30b and 32a/32b along axial direction 14
mp: magnet, or pole, pitch 40
$KF_{(A-C)}$: Constant that is dependent upon actuator design Methods for determining phase force constants under actual conditions should be well understood and are, therefore, not discussed in detail. It should be understood however, that while the ideal example for the phase force constant is described herein, this is for exemplary purposes only and that the phase force constant may be defined by known methods in actuator design.

Figure 6:
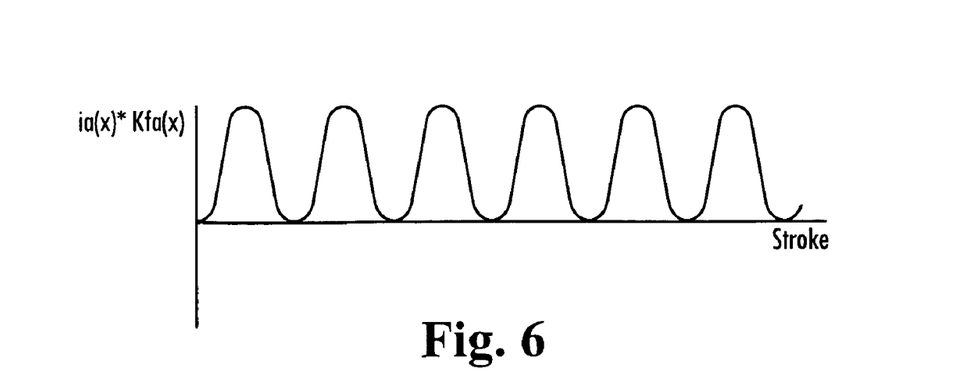
FIG. 6 is a graphical representation of a phase force constant applicable to the system as shown in FIG. 3.

As reflected in the equations above, where phase_shift is zero (i.e. where ia(x), ib(x) and ic(x) correspond entirely to q-axis current), ia(x) is in phase with Kfa(x), and ib(x) is in phase with Kfb(x), and ic(x) is in phase with Kfc(x). Force $F_{out}$ between the plunger and the stator is the sum of the multiplication of each current signal by its corresponding phase force constant. FIG. 6 illustrates the portion of $F_{out}$ contributed by ia(x) and Kfa(x). As should be understood, since ia(x) is entirely comprised of q-axis current, the force curve has a DC offset that makes the entire force curve positive, and frequency doubles. The remaining two components of $F_{out}$, contributed by ib(x) and Ktb(x), and by ic(x) and Kfc(x), have the same shaped curve as shown in FIG. 6 but are offset from each other and from the component contributed by ia(x) and Kfa(x) by 120°. $F_{out}$, being the sum of the three components, is a constant force, and thus the three phase actuator 10 applies a constant force to plunger 12 by application of three-phase currents ia(x), ib(x) and ic(x) to the respective coil pairs.

The addition of a non-zero phase_shift to current ia(x) shifts the phase of the ia(x) curve with respect to its phase force constant curve, thereby reducing the DC offset in the force curve shown in FIG. 6, so that a portion of the force curve is negative. When the same phase_shift is applied to each of the other two current signals, ib(x) and ic(x), the same reduction in DC offset occurs in their respective force curves. The three force curves still sum to a constant, $F_{out}$, but the value of constant $F_{out}$ is lower than when phase_shift is zero. When phase_shift is 90°, i.e. when the coil current signals produce air gap magnetic flux density curves that are 180° out of phase with their corresponding air gap magnetic flux density curves from the plunger permanent magnets, $F_{out}$ is zero. Similarly to the electrical q-axis phase, however, the particular phase_shift at which the least efficient application of coil current occurs will likely differ slightly from the ideal 90° shift. Current at such an electrical phase shift relative to the q-axis current is known as "d-axis" current. It is known to apply a d-axis current component in driving motors operating in steady state-type environment for field weakening to extend the motor's upper speed range without using a higher voltage supply. While a plunger with a plurality of permanent magnets is described in the example, one skilled in the art should understand from the present disclosure that systems and methods as described herein may be implemented using a shaft with a plurality of magnets, wherein some or all of the magnets can be permanent magnets or electromagnets.

It should be understood that coil current may be described in terms of individual coil currents ia(x), ib(x) and ic(x), or in terms of q-axis and d-axis components iq(x) and id(x). The synchronous frame transform between these descriptions should be well understood:

$iqs(x)=ia(x)$, and $ids(x)=ib(x)*1/(3)^{1/2}-ic(x)*1/(3)^{1/2}$ and $I_q(x)=iqs(x)*(\cos(phase)-\sin(phase))$, and $I_d(x)=ids(x)*(\sin(phase)+\cos(phase))$, where
phase: phase_shift,
iqs(x): q-axis current in the stationary reference frame,
ids(x): d-axis current in the stationary reference frame,
$I_q(x)$: q-axis current in the rotating reference frame, and
$I_d(x)$: d-axis current in the rotating reference frame.

Where the coil current signals ia(x), ib(x) and ic(x) are comprised entirely of d-axis current, the stator coils apply no net force, or a minimum force within the possible range of force applicable by the system, to the plunger. If the electric current controlled on the coils comprises a mix of q-axis and d-axis current, and if the maximum instantaneous current values Ia, Ib and Ic are the same in all three instances, the actuator applies a force to the plunger at a magnitude between the minimum force that results with wholly d-axis current and the maximum force that results with wholly q-axis current. Note that because maximum current remains the same in all three instances (i.e. wholly q-axis current, wholly d-axis current, and mixed q-axis and d-axis current), the actuator consumes the same amount of power in all three instances.

Assume now, for an exemplary arrangement and as described in more detail below, that actuator 10 is part of a vehicle suspension system, such that plunger 12 is directly connected to a vehicle wheel assembly 15 or a suspension system for a seat, and stator 16 is sufficiently proximate the seat that heat from stator 16 transfers to the seat. Under normal circumstances, motor control systems 17 (FIG. 1) and 21 sense the position and/or velocity of plunger 12 and determine a corrective force to the plunger via a corresponding instruction 19 to inverter 34 that results in a response in the wheel suspension or the seat that improves the vehicle's handling and/or that is comfortable to the vehicle operator sitting in the seat, or warms a seat suspension module or actuator to bring its temperature to a suitable operating temperature, for example when the environment temperature is below a suspension module normal operating temperature such as 0° C. The force correction can be determined by processor 58, but in another embodiment is determined by a separate processor that provides the force command to processor 58. A system for determining and applying such a desired force to a seat in a vehicle is described, for example, in co-pending U.S. patent application Ser. No. 10/978,105, entitled "Active Suspending" and filed Oct. 29, 2004, which is incorporated herein in its entirety. The particular corrective algorithm is not, in-and-of-itself, a part of this embodiment, and a detailed discussion of the algorithm itself is therefore omitted. However, at any given time during which control system 17 or 21 is active, the control system defines this force command, and, based on the force command, inverter 34 defines a maximum instantaneous current magnitude Ia, Ib and Ic (with regard to control system 21, either directly or by defining q-axis and d-axis components) for the respective three phase coil pairs that will result in a predetermined desired zero or non-zero force to be applied to the plunger. As explained above, it is known to determine this maximum current magnitude entirely of q-axis current. In one presently described embodiment, however, and referring to FIG. 3, if the vehicle operator activates a switch to actuate a seat warming function, or when a sensor, such as a temperature sensor, detects that actuator's environment temperature is below its operating temperature, a seat warming signal is sent to control system 21. Control system 21 performs the functions of control system 17 (FIG. 1) discussed above, but in addition, in response to the seat warming request signal, control system 21 introduces a phase_shift (which may also be described as adding a d-axis component) to the three-phase currents. Since the phase_shift has the effect of reducing the force applied to the plunger if the maximum current magnitudes Ia, Ib and Ic stay the same as they are when phase_shift is zero, the maximum current magnitude (Ia, Ib and Ic) can be increased by an amount sufficient to maintain the desired force as defined by the corrective algorithm. In one particular example discussed below, this effect is achieved by determining a q-axis current needed to achieve the desired force and adding a d-axis component to generate additional desired heat. That is, maintaining the q-axis component, while adding the d-axis component, adds a phase_shift while increasing the maximum current magnitude to maintain the desired force on the plunger.

Alternatively, where the system determines phase_shift in terms of phase rather than in terms of a d-axis component, the desired $F_{out}$, as well as the phase force constants, the relative stator/plunger position and the pole pitch are known, and the currents Ia, Ib and Ic needed to produce the desired $F_{out}$ at the defined phase_shift can be determined from the equations above. Accordingly, under either method, a d-axis component is applied, and the force applied to the plunger in the presence of the phase_shift/d-axis component is equal to the desired force defined by the corrective algorithm and is the same force that the actuator would apply to the plunger in the absence of the phase_shift/d-axis component. Because of the phase_shift/d-axis component, however, the control system controls greater current for dissipation on the stator coils as this same force is achieved. That is, more power is consumed to achieve the same force, thereby resulting in the generation of more heat.

The effect of this addition of d-axis current in this exemplary arrangement can be described with reference to the force diagram shown in FIG. 2. The system may periodically (at the sampling rate) determine a desired force that is to be applied to plunger 12 (FIG. 3) according to the force correction algorithm. As described above, this force results from the q-axis current, or $I_q$. Since the user has requested seat warming, however, the system also desires to apply a predetermined electric current level to the actuator coils to provide heat represented by dissipated power 6. This current, used for dissipated heat but not for force applied to the plunger, is d-axis current $I_d$. As should be understood, q-axis current also contributes to heat dissipated in the coils, and an increase in q-axis current (if desirable) could therefore be used to further increase generated heat, but this would also increase force applied to the plunger. Thus, use of a d-axis current addition allows generation of heat without altering application of desired force to the plunger.

A request for seat warming in this example corresponds to a request for a predetermined dissipated power 6. It should be understood that the system may provide the user a choice through multiple switch selection options, among multiple seat warming levels, each corresponding to a respective desired dissipated power level 6. The coil resistance is known and, as described below, processor 58 estimates actual dissipated power 6 at any given time. If the actual dissipated power is lower than the desired dissipated power, then the total current level, $I_T$, should be increased to raise dissipated power to the desired level. The total current level, $I_T$, is the geometric sum of the q-axis and d-axis currents, or $$I_T = (I_q^2 + I_d^2)^{1/2},$$

Where $I_q$ and $I_d$ are in the rotational reference frame. Referring to coil 26a (FIG. 3), Ia at a given instant, i.e. a given position x of plunger 12 (FIG. 3) with respect to the stator, can be considered $I_T$ at that instant for that coil. The instantaneous electric currents Ib and Ic for the other two coils can be considered similarly. As described above, processor 58 receives a force command from which the processor determines the q-axis current $I_q$ needed at a given time. Thus, based on the formula for $I_T$ noted above and the known coil resistance, processor 58 determines the value of $I_d$ needed to raise Ia (i.e. $I_T$ for coil 26a) to a level sufficient to produce the desired dissipated power. The relationship between $I_q$ and $I_d$ defines phase_shift. Control system 21 controls suspension actuator 10 to draw the determined total electric current at this phase_shift, i.e. to draw a total electric current comprised of these q-axis and d-axis components, for each of the actuator's three coils. Since power can be described as $I^2R$, where I is current and R is coil resistance, instantaneous dissipated power 6 is $(I_q^2 + I_d^2)*R$, plus core losses and amplifier losses.

Accordingly, the instantaneous dissipated power 6 that results from the q-axis and d-axis currents, and amplifier losses, can be considered a known or determinable (albeit dynamic) value, as is the force $F_{out}$ between suspension actuator 10 at plunger 12 that results from the q-axis current. $F_{out}$ contributes to the velocity of plunger 12 and therefore to actuator mechanical power 2, but the magnitude and direction of mechanical power 2 is also substantially affected by other external forces applied to plunger 12. Thus, depending on $F_{out}$ and these forces external to actuator 10, plunger 12 has a velocity with respect to stator 16 (FIG. 3), and this velocity (specifically, velocity multiplied by $F_{out}$) defines an actuator mechanical power 2 that has a magnitude and a direction, i.e. either flowing into or out of actuator 10, as indicated in FIG. 2. Because the three interface powers have to sum to zero (i.e. the total of power flowing into actuator 10 must equal the total of power flowing out of actuator 10), the dissipated power described above and the actual actuator mechanical power 2 define the magnitude and direction of DC bus power 4. If $F_{out}$ and the velocity of plunger 12 are in the same direction, mechanical power 2 is flowing out of actuator 10 (i.e. to the right in FIG. 2), and therefore DC bus power 4 must flow into actuator 10 and have a magnitude equal to the sum of the magnitudes of mechanical power 2 and dissipated power 6. Thus, battery 11 must provide all of the electric current needed for $I_q$ and $I_d$. If, on the other hand, $F_{out}$ and plunger velocity are in opposite directions (i.e. if the force correction algorithm causes the control system and the suspension actuator to apply a force to the plunger that opposes the plunger's actual movement at that instant), then actuator mechanical power 2 is flowing into actuator 10 (i.e. to the left in FIG. 2). If the magnitude of mechanical power 2 is less than the magnitude of dissipated power 6, then DC bus power 4 must flow into actuator 10 and have a magnitude equal to the difference in magnitudes of mechanical power 2 and dissipated power 6. In this instance, both battery 11 and the mechanical power are electric current sources to actuator 10 to provide the needed q-axis and d-axis currents, as described in more detail below. If the magnitude of mechanical power 2 is greater than the magnitude of dissipated power 6, the DC bus power 4 flows out of actuator 10 onto the DC bus, so that a regeneration event occurs. The magnitude of DC bus power 4 is the difference in magnitudes of mechanical power 2 and dissipated power 6. In this instance, the mechanical power provides the electric current source for the q-axis and d-axis currents and puts electric current back onto the DC bus and into battery 11, such that actuator 10 behaves as a generator.

Regeneration current into battery 11 can recharge the battery and can be, to that extent, beneficial. However, regeneration events can be of such severity as to direct a level of electric current onto the DC bus that would damage the battery or reduce its effective lifespan. Such events can result, for instance, where actuator 10 is part of a vehicle suspension system such that plunger 10 is directly connected to a wheel assembly 15 (there being four actuators in a four-wheeled vehicle, one for each wheel). The stator housing may be connected to the vehicle chassis 25, while the plunger may be connected to the wheel assembly. When the vehicle passes over a speed bump or a severe hole in the road, the plunger moves suddenly and at a significant velocity, often in a direction opposite to that of $F_{out}$. Thus, it is known to put a substantial parallel capacitance (e.g. capacitance 23, as shown in FIG. 1) on the DC bus that can store regeneration energy, sometimes referred to as a regeneration pulse, and discharge stored current back onto the bus. Properly designed capacitors can operate effectively and reliably in this manner, but the incremental component costs and added physical volume requirements needed to provide sufficient capacitance to accommodate significant regeneration events may be undesirable, particularly in vehicle applications.

Accordingly, and as described in more detail below, control system 21 may monitor the position and velocity of plunger 12 and, upon detecting a regeneration event that exceeds, or will likely exceed, a predetermined maximum power level (or energy level over a period of time), increase the d-axis electric current component discussed above, preferably so that DC bus power 4 is reduced so that the resulting electric current will not damage the battery system. Regeneration compensation can be effected in the presence or absence of the application of d-axis current for seat warming, the simultaneous application of both procedures simply adding more d-axis current to the coils than only one.

As should be understood in this art, any electric actuation system defines a maximum output torque or force that can be developed, often predominantly a thermal limitation of the motor or amplifier. Since the amplifier's heat is directly proportional to overall current $I_T$, a limit on $I_T$ may he defined, as should he understood. If, for a given motor, the addition of a d-axis's component to current results in an overall current $I_T$ that exceeds this threshold, the d-axis current addition is reduced until total current is below the threshold.

The presently-described embodiments are discussed in the context of current-controlled commutated actuators. It should be understood that while the present discussion relates primarily to brushless DC actuators, the present invention may be implemented as part of an induction motor control system. As should be understood, it is necessary in such a configuration to account for slip in expressing output force (torque, for a rotary AC motor) in terms of a q-axis component aligned with rotor flux. Thus, for instance, the present invention may be implemented as a current-controlled, commutated induction AC induction motor. "Commutation" refers to control of current in an actuator based on a relationship between shaft (e.g. rotor or plunger) positions and an amplifier.

The inverter is an amplifier that presents an alternating voltage signal to the coils. Adjustment of the inverter's duty cycle is an adjustment of the amplifier's variable gain, and a given gain results in an alternating average current signal on a coil pair. This alternating average current is the alternating current signal that produces the alternating air gap flux density shown in FIG. 5. Thus, the control circuitry defines the amplitude of the current signal applied to the motor coils, the phase of the current signals with respect to each other, and the phase of the curve of the air gap magnetic flux density by the currents with respect to the curves defined by the air gap magnetic flux density from the plunger magnets. While a voltage sourced inverter is described, other inverter such as a current sourced inverter is also. applicable.

When the plunger moves rapidly in response to a regeneration event, resulting back emf in each of the coil pairs 28, 30 and 32 can be large. Where the inverter applies current signals to the actuator coils that apply a force to the plunger in opposition to the plunger's velocity, the emf's oppose the voltage signal applied to the coils by the inverter, and in events such as potholes and speed bumps, significant electrical current (regeneration current) can be passed back onto the DC bus through the inverter's diodes. That is, the significant increase in the leading voltage in the coils significantly lowers the system displacement power factor (the time phase relationship between the inverter output voltage and current), thereby significantly increasing the power reflected back to the source and, therefore, the electric current regenerated to the DC bus.

In the presently described embodiment, the displacement power factor is effectively increased due to the additional real power dissipated in the motor coils as a result of the d-axis current component, thereby reducing net current applied back through the DC bus to power source 42. That is, power factor is increased by increasing the power applied by the system power source so that it equals or is closer to the load power, thereby decreasing or substantially eliminating power reflected back to the system power source.

Figure 7:
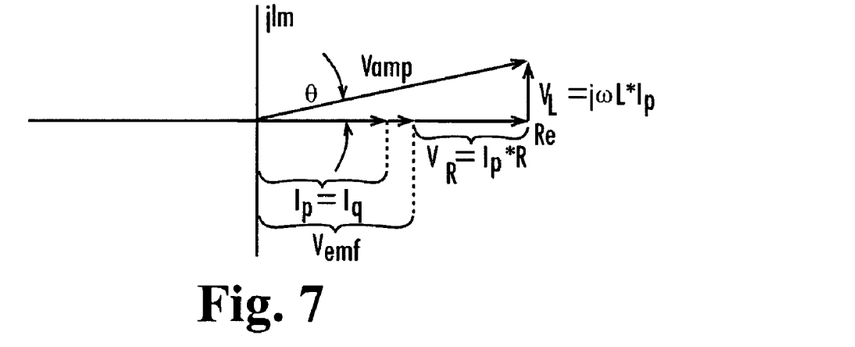
FIG. 7 is a phase diagram for an actuator circuit.
Figure 8:
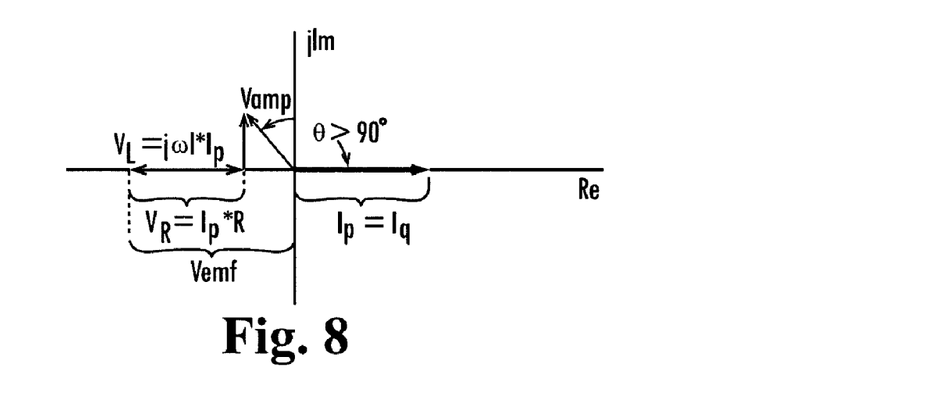
FIG. 8 is a phase diagram for an actuator circuit.
Figure 9:
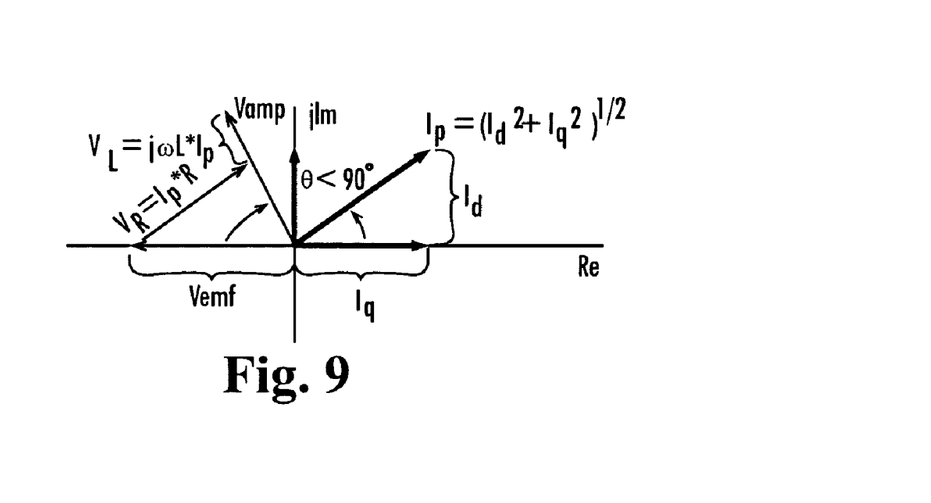
FIG. 9 is a phase diagram for an actuator circuit in accordance with the system as shown in FIG. 3.

The effect of the control of a d-axis current component on the actuator coils is illustrated graphically by phase diagrams shown in FIGS. 7-9. Each phase diagram illustrates voltage drops and current in a circuit comprising the battery/inverter (considered as a single voltage source), a resistance of one of the coil pairs, an inductance of one of the coil pairs, and, where applicable, the back emf. "$V_{amp}$" refers to the voltage across the battery/inverter source. "$V_R$" refers to the voltage across the coil resistance. "$V_L$" refers to the voltage across the coil inductance. "R" refers to the coil resistance. "L" refers to the coil inductance. IP refers to total current in the circuit. "$I_D$" refers to the d-axis component of $I_P$. "$I_Q$" refers to the q-axis component of $I_P$.

Referring to FIG. 7, and as described above, if it is desired to apply a force to the shaft via application of electric current to the stator coils, an efficient way to do so is to:

(1) know the velocity of relative movement between the stator and the shaft, (2) know the pole pitch of the shaft magnets, (3) from these two pieces of information, determine the frequency of the magnetic flux signal from the stator across the air gap, (4) know the relationship between current in the coils and resulting force on the shaft when the current is q-axis current, (5) know the magnitude of the force desired to be applied to the shaft, and (6) control the inverter to define voltage signal $V_{amp}$ at the frequency defined at (3), timed so that the voltage signal varies at the electrical q-axis phase, and at a magnitude to produce current IP that results (via the relationship defined at (4)) in the force defined at (5).

As should be understood in this art, however, the shaft produces a back emf ($V_{emf}$), according to the relationship:

$$V_{emf} = d\text{Flux}/dt = (d\text{Flux}/dx)*(dx/dt),$$

where "Flux" is the air gap magnetic flux density curve contributed by the plunger magnets (FIG. 4), and dx/dt is the plunger velocity. Thus, the back emf is always in phase with q-axis current if the shaft is moving in the direction with the force applied to the shaft by the q-axis current and is always 180 degrees out of phase with the q-axis current if the shaft is moving opposite to the direction of the force applied to the shaft by the q-axis current.

In FIG. 7, $V_{amp}$ is controlled to apply only q-axis current, and the shaft is moving in the direction of the force on the shaft applied by the q-axis current, and $V_{emf}$ is therefore in phase with the q-axis current. This means $V_{emf}$ is in phase with $V_R$, the voltage drop across the resistor.

As should be understood in this art, an angle $\Theta$ between $V_{amp}$ and $I_P$ is related to power factor according to the cosine of $\Theta$. If COS $\Theta$ is positive, power factor is positive, and there is no regeneration current on the system. If COS Θ is negative, power factor is negative, and there is regeneration current on the system.

The formula to solve for Ip is:

$$((V_{emf}+I_P*R)^2+(I_P*\overline{\omega}L)^2)^{1/2}=V_{amp}$$

As indicated in FIG. 7, COS Θ is positive. Thus, power factor is positive, and there is no regeneration current.

In FIG. 8, the shaft is moving in the direction opposing the force applied to the shaft by the q-axis coil current. Again, the length (i.e. magnitude) of $V_{amp}$ is fixed by the inverter. $V_{emf}$ is negative. $I_P$ is again given by the following formula:

$$((V_{emf}+I_P*R)^2+(I_P*\overline{\omega}L)^2)^{1/2}=V_{amp}$$

Since $V_{emf}$ is greater in magnitude than $V_{amp}$ in this example, $I_P$ has to be positive, as shown in FIG. 8. Θ is between 90° and 270°; power factor is negative; and regeneration current occurs.

Referring also to FIG. 9, if, in such a regeneration event, the inverter is controlled to introduce a d-axis component to $V_{amp}$, then $I_P$ also includes a d-axis component, and $I_P=(I_Q^2+I_D^2)^{1/2}$. Since $V_{emf}$ is always in phase with or 180 degrees out of phase with the q-axis current $I_Q$, $V_{emf}$ is aligned with $I_Q$, rather than $I_P$, and $I_Q$ is at an angle with respect to $V_{emf}$. $V_{amp}$, as it is in the examples above and must be, is the vector sum of $V_{emf}$, $V_R$ and $V_L$, as shown in FIG. 9. Thus, given a magnitude of $V_{amp}$, a magnitude of $V_{emf}$ and a phase shift in $I_P$ (i.e. the addition of a d-axis component), the magnitude of $I_P$ can be determined. This, in turn, determines the phase of $V_{amp}$ with respect to $V_{emf}$ and Θ, As indicated in FIG. 9, the addition of the phase shift to $I_P$ in this arrangement reduces Θ. If sufficient phase shift is added to $I_P$ to bring Θ below 90 degrees, the power factor becomes positive, and there is no regeneration current on the DC bus.

When the system operates in the linear range, in other words, when there is no magnetic saturation, the addition of a d-axis current component to the current the inverter applies to the actuator coils does not affect the q-axis component. It remains the same. Thus, the addition of the d-axis component increases the overall current applied to the actuator but does not affect the current, as defined by the suspension algorithm, used to apply force to the plunger. Accordingly, the steps of determining and applying a d-axis current component to the inverter output do not affect application of current signals in response to the suspension algorithm.

Figure 10:
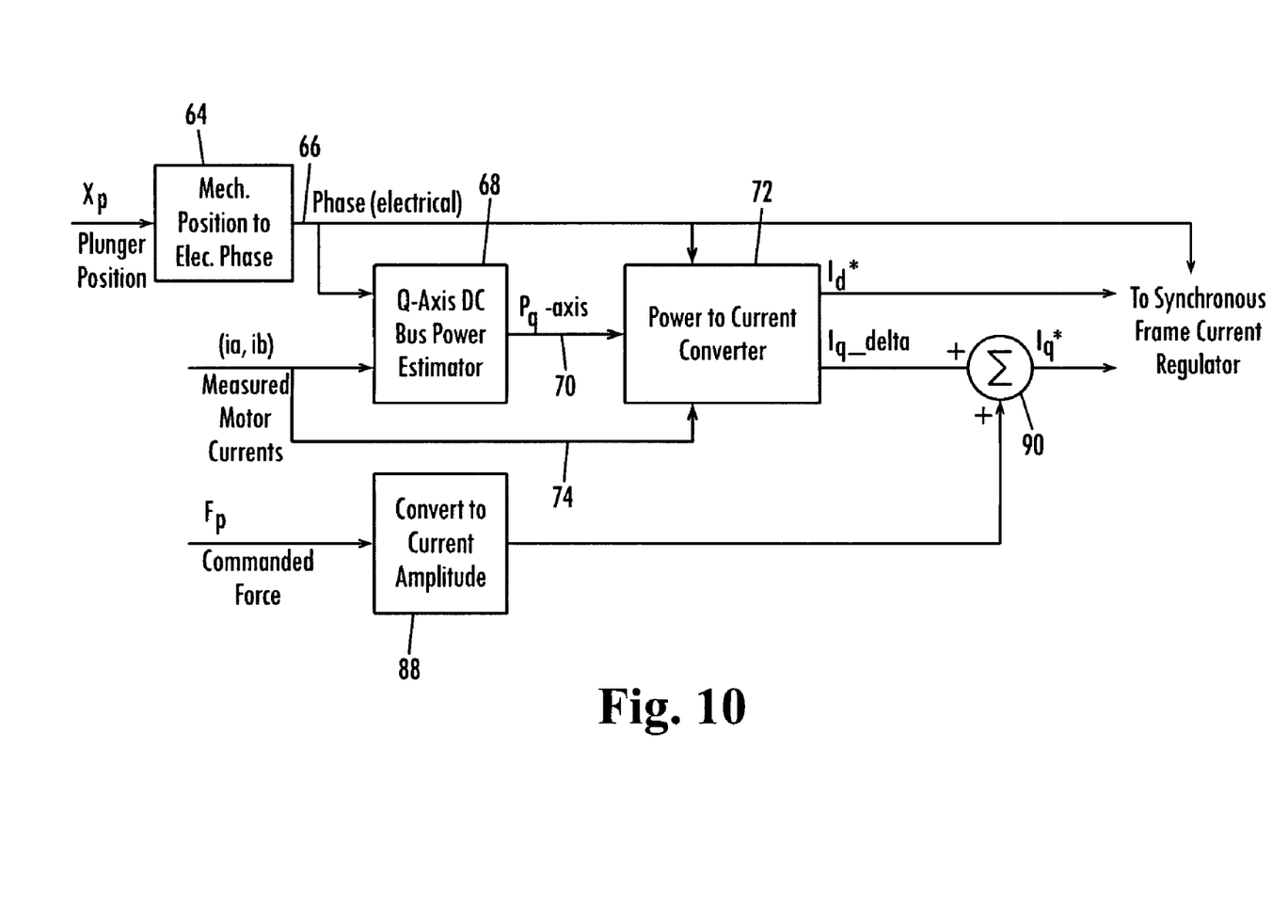
FIG. 10 is a functional block diagram of a procedure effected by the system as shown in FIG. 3.

Referring to FIGS. 3 and 10, the control system for suspension actuator 10 may comprise circuitry comprised of a processor 58 and a synchronous frame current regulator 60 that controls inverter 34. The exemplary control system has four inputs—a motor linear position $x_p$, a current ($i_a$) of coil 26a, a current ($i_b$) of coil 26b, and force command $F_p$ from the suspension controller (not shown). Motor linear position $x_p$ refers to the position of plunger 12 with respect to stator 16 as measured by a linear encoder 62, which may be considered part of the control system. Linear encoders are well understood high-resolution sensors capable of measuring the mechanical displacement of plunger 12 relative to stator 16 to a resolution of 0.01 millimeters (mm), but it should be understood that a different type of sensor could be used, or that other resolutions could be used, provided the sensor accommodates system resolution demands. In an embodiment comprising a rotary actuator, for example, a rotary encoder may be used. In general, where a sensor is used, the sensor may be selected to match the physical relationship between the stator and the shaft.

Linear encoder 62 outputs a signal to current regulator 60 that describes the relative mechanical displacement between the plunger and the stator. In the presently described embodiment, processor 58 is a digital controller that runs at a sample rate of, in this example, 8 kHz.

FIG. 10 illustrates processing steps in an exemplary regeneration compensation function as functional blocks executed by the processor in software. When processor 58 receives the sampled position data from linear encoder 62 via current regulator 60, the position data (in mm) $x_p$ (i.e. the relative position between the stator and the shaft, as described above) is provided to a Mechanical Position to Electrical Phase block 64 that converts the linear distance data to phase for output at 66. As noted above, the plunger's magnetic pole pitch is known. Since pole pitch corresponds to 1 pi radians, Mechanical Position to Electrical Phase block 64 determines phase output 66 by multiplying sampled (relative) position data $x_p$ by pi/(pole pitch). Since phase output 66 describes the phase position between plunger 12 and stator 16, and in particular the relative phase between the stator coils and the plunger poles, phase output 66 describes the actual relative phase between the air gap flux density curve contributed by the plunger magnets (FIG. 4) and the air gap flux density curve contributed by the coils (FIG. 5).

Linear encoder 62 also provides information sufficient to determine the plunger's velocity through sampling of position data over time, as should be understood in this art, although it should also be understood that some linear encoders may provide velocity as a direct output signal.

The system includes current sensors on the amplifier DC bus that directly measures DC bus current. In one example, two of the three phases currents are measured. Current regulator 60 samples (at the 8 kHz rate) the magnitudes (in amps) $i_a$ and $i_b$ of the actual electrical current on coils 26a and 26b, as indicated at 74. Current regulators, including their sampling of plunger/rotor position and motor current magnitude and phase, should be well understood and are, therefore, not discussed in further detail herein. In the presently-described system, current regulator 60 comprises a software component of processor 58 (and thus, could be considered part of the block for processor 58 in FIG. 3), but a current regulator comprising hardware components could also be used.

The instantaneous amplitude of the currents on coils 26a and 26b also define the actual instantaneous amplitude of the current on coil 26c, since currents on the three coils must add to zero, by Kirchoff's current law. Based on the magnitude of the actual current on the three coils at the instant the sample is taken, the mechanical phase between the plunger and the stator at that instant, as described above, and predetermined calibration information for the particular motor regarding the actual q-axis offset, Q-axis DC Bus Power Estimator block 68 determines the actual q-axis and d-axis current on the DC bus. Methods for estimating q-axis and d-axis current from such information should be understood in this art and are therefore not described in detail herein.

Having determined the q-axis and d-axis currents on the actuator coil lines, Q-axis DC Bus Power Estimator 68 estimates the dissipated power 6 (FIG. 2) in the coils arising from q-axis current. In terms of q-axis current, power from coil losses are $(I_q^2)*(3/2)*R_p$, where $R_p$ is the per-phase coil resistance. Dissipated power due to coil resistance (i.e. $I^2R$ loss), however, does not constitute all of the dissipated power. Coil resistance losses can be about 70% of the overall dissipated power 6, although it should be understood that the actual percentage for a given actuator can vary with the actuator's design and manufacture, with the remainder being comprised of power electronics losses, core losses and possible other loss sources. Contributions to dissipated power 6 due to power electronics (primarily in the inverter/amplifier 34) and motor core losses should be known from the design of a given actuator, and estimator block 68 adds this estimated value to the coil resistance loss (for each coil pair), so that the final sum is an estimate of the dissipated power 6 at the instant of the electric current sampled by linear encoder 62. Contributions to dissipated power due to power electronics, motor core losses and other losses are predictable as a function of q-axis current. Thus, in one example, controller 21 stores a look-up table that defines such losses by q-axis current so that given a q-axis current determined at Estimator block 68, processor 58/block 68 looks up these other losses from the table.

Estimator block 68 then estimates actual actuator mechanical power 2 (FIG. 2). Actual mechanical power between the stator and the plunger is $F_{out}$ multiplied by the plunger's actual velocity. As noted above, the control system derives the plunger's velocity from position data acquired by linear encoder 62. Thus, estimator block 68 determines $F_{out}$ based on the actual q-axis current determined above. Since d-axis current does not contribute to force applied to the plunger, d-axis current is not used to determine $F_{out}$. In terms of q-axis current:

$$F_{out}=I_q*Kf,$$

where:
$I_q$ is the instantaneous q-axis current, collectively, on the three coils as determined by estimator block 68; and $$Kf=1.5*\text{Max}(Kfa(x), Kfb(x), Kfc(x))$$

Estimator 68, now having $F_{out}$ and plunger velocity for the sampling instant, multiplies these values to thereby determine mechanical power 2. The sign of mechanical power 2 (i.e. whether mechanical power is flowing into or out of actuator 10) is determined by the direction of the plunger's velocity. If the velocity is in the same direction as $F_{out}$, mechanical power is positive (i.e. flowing out of the actuator). Otherwise, mechanical power 2 is negative (i.e. flowing into the actuator). As noted above, dissipated power 6 flows out of the actuator and can be considered positive for purposes of this discussion. Estimator 68 sums dissipated power 6 and actual mechanical power 2. The result, $P_{q-axis}$, is the power on the DC bus that would occur if the actuator were controlled to apply only q-axis current on the coils. If the result is positive, then DC bus power 4 is positive, i.e. DC bus power 4 would flow into the actuator in such circumstances. This situation occurs if both dissipated power 6 and mechanical power 2 are flowing out of the actuator or, if mechanical power 2 is flowing into the actuator, dissipated power 6 is greater than mechanical power 2. If the result is negative, i.e. if mechanical power 2 flows into the actuator and is greater than dissipated power 6, a regeneration event would occur.

Estimator 68 outputs the estimated DC bus power $P_{q-axis}$ (including its sign—i.e. positive if flowing into the actuator and negative if flowing out of the actuator) at 70 to a Power-to-Current Converter functional block 72. Converter 72 also receives the plunger's position data $x_p$ from mechanical position block 64, and receives the magnitude of the actual current on coils 26a and 26b from current regulator 60, as indicated at 74.

Figure 11:
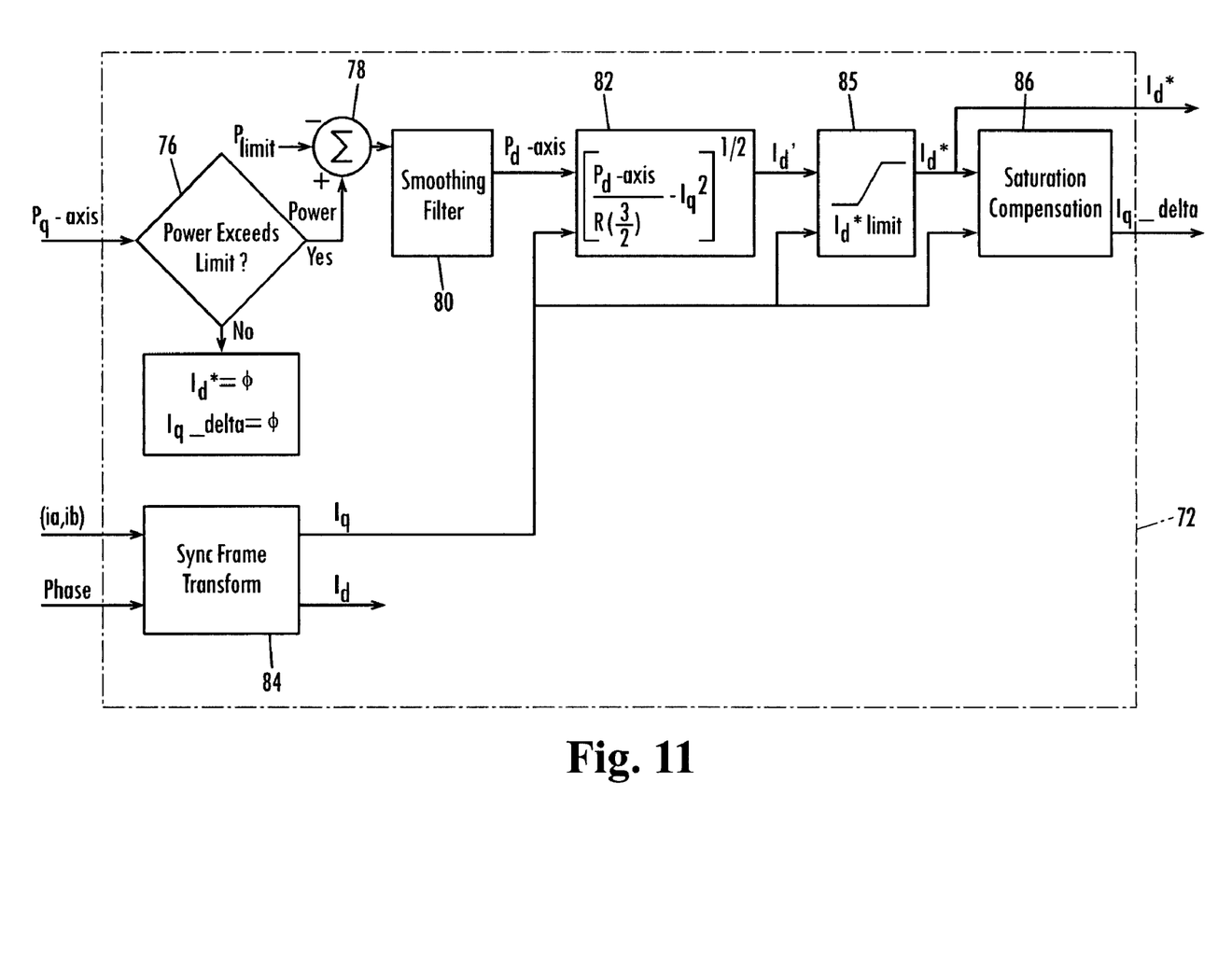
FIG. 11 is a functional block diagram of a procedure effected by the system as shown in FIG. 3.

FIG. 11 expands converter 72 into an example of its component functional blocks. Thus, referring to FIGS. 3, 10 and 11, at block 76 converter 72 compares estimated DC bus power $P_{q-axis}$ to a predefined DC bus power limit. The predefined limit corresponds to a regeneration (i.e. negative) power level on the DC bus and is preferably set to a negative power level that allows regeneration up to a point that the regeneration is either absorbed by bus capacitance or beneficially recharges the battery without undesirably damaging the battery. As should be understood, battery construction differs among battery manufacturers and battery types from a given manufacturer. If a desired battery life and power characteristics are known, battery manufacturers can generally provide a peak regeneration current that should be accepted by the battery to achieve such performance, and this peak level may be used to determine a power level for use as the predefined level for use at decision block 76. Thus, the predefined limit may vary among systems using different batteries.

If $P_{q-axis}$ exceeds (or is less than, if both values are considered negative) the predetermined regeneration level, $P_{limit}$, then a summing block 78 determines the difference between $P_{axis}$ and $P_{limit}$. The result, $P_{d-axis}$, is the d-axis power that is desired to be dissipated as part of dissipated power 6. $P_{d-axis}$ is applied to a smoothing filter, at 80, to smooth the step function provided by 76 and 78 before application to the current regulator.

At 82, converter 72 converts the desired d-axis power to a desired d-axis current. Block 82 receives desired d-axis power $P_{d-axis}$ from smoothing filter 80 and receives the measured actual coil q-axis current from a synchronous frame transform block 84. Transform block 84 receives the phase currents from coils 26a and 26b, which as described above thereby defines the instantaneous amplitude of current on coil 26c, and the phase of the plunger with respect to the stator. From the three coil currents, block 84 determines the overall actual coil current, $I_q$. Using the plunger phase, block 84 then determines the q-axis component $I_q$ of this current, as discussed above. Applying $P_{d-axis}$, $I_q$, and R (where R is the per phase resistance) to the formula indicated in block 82 in FIG. 11, converter 72 determines a d-axis current $I_d'$ that will create the desired additional power loss in the motor coils and thereby limit regeneration power onto the DC bus.

At block 85, converter 72 combines measured actual q-axis current $I_q$ and desired d-axis current $I_d'$ into a total current value and compares that value with a total current limit. As described above, system current preferably does not exceed a predetermined maximum level. If the combined actual q-axis current and desired d-axis current exceeds the predetermined limit, converter 72 reduces $I_d'$ to a value $I_d^*$ until the combined total current falls within an acceptable level.

Functional block 86 provides saturation compensation for the q-axis current level. As should be understood, as electric current in the coils increases, the flux that the coil current produces does not increase linearly, due to saturation effects. Block 86 determines an adjustment to the q-axis current to account for saturation effects, output as $I_{q\_delta}$. Saturation effects may be described as the reduction in force constant as coil current increases, and are a function of particular motor/actuator design that can be determined by a model based on manufacturer's motor information, or through testing. Thus, saturation effects may be stored in a look-up table so that, for a given $I_d^*$ and $I_q$, converter 72 simply selects $I_{q\_delta}$ from the look-up table. The output of block 86, and therefore converter block 72, is the desired d-axis current $I_d^*$ and a desired change in q-axis current, $I_{q\_delta}$.

If, at 76, the measured regeneration power is less than $P_{limit}$, then $I_d^*$ and $I_{q\_delta}$ are set to zero.

The control system, via Motor Force Constant Profile block 88 receives the force command $F_p^*$ from the suspension controller and, from that input, defines the desired q-axis current. The force command is the requested force that the suspension controller calculates should be applied to the plunger to achieve a desired effect. Block 88 translates this force command to a q-axis motor current value needed to produce that force in the actuator. Thus, for any given force command input, block 88 determines the desired q-axis current $I_{qp}$ from the lookup table. The desired q-axis current $I_{qp}$ is modified by $I_{q\_delta}$ at summing functional block 90. The control system outputs the resulting q-axis current command $I_q^*$ and d-axis current command $I_d^*$ to current regulator 60.

In another exemplary arrangement, the system comprises multiple actuators and control systems. For instance, a vehicle may have four or more wheels in the suspension system, each with its own actuator 10 (FIG. 3) controlled by a respective amplifier 34. The four (or more or less, depending on the number of vehicle wheels) amplifiers are disposed in parallel with respect to each other, capacitor 23 and battery 11. Each amplifier is controlled by the same processor 58 to control the mix of d and q currents, but each amplifier implements a separate current regulator 60. Each amplifier has its own linear amplifier 62.

In this arrangement, the instantaneous regeneration current from any one of the amplifiers may be dissipated in one or more of the other amplifiers. Thus, to the extent the other amplifiers are not experiencing a regeneration event, the current from the regeneration amplifier flows to the non-regeneration amplifiers rather than the battery. Referring also to FIGS. 10 and 11, processor 58 determines $P_{q\text{-}axis}$ simultaneously for each amplifier. For each individual amplifier, at block 76, processor 58 receives $P_{q\text{-}axis}$ from each respective estimator block 68 for the multiple actuators, and sums. As noted above, $P_{q\text{-}axis}$ is positive if power is flowing into the respective actuator, and negative if flowing out (i.e. if a regeneration event is occurring for that actuator), and so the sum of the multiple $P_{q\text{-}axis}$ terms is the power seen by the battery across all the actuators. This summed value is compared to $P_{limit}$ as discussed above to determine if a d-axis component should be added to the current for the regeneration actuator.

While one or more embodiments of the present invention have been described above, it should be understood that any and all equivalent realizations of the present invention are included within the scope and spirit thereof. Thus, the embodiments presented herein are by way of example only and are not intended as limitations of the present invention. Therefore, it is contemplated that any and all such embodiments are included in the present invention as may fall within the scope of the appended claims.

What is claimed is:

1. A method of controlling an actuator having a stator, a shaft with a plurality of magnets, wherein the stator and the shaft move relative to each other at an interface between the stator and the shaft so that the plurality of magnets provide a first magnetic flux that varies in magnitude and direction along the interface, at least one coil defined on the stator with respect to the interface so that an electric current applied to the at least one coil provides a second magnetic flux that varies in magnitude and direction along the interface responsively to variations in the electric current, said method comprising the steps of:
   (a) receiving by a controller a first input comprising a first signal indicating a request for a force to be output by the actuator;
   (b) receiving by the controller a second input comprising a second signal indicating a request to dissipate electrical power in the actuator;
   (c) in response to the first input, controlling the second magnetic flux so that the second magnetic flux has a predetermined phase with respect to the first magnetic flux;
   (d) in response to the second input, and variably with respect to the first input, controlling the second magnetic flux so that the phase of the second magnetic flux with respect to the first magnetic flux shifts from the predetermined phase, and the magnitude of the second magnetic flux is controlled in order to substantially maintain the requested force output of the actuator.

2. The method as in claim 1, wherein the second signal carries information indicating the presence of a regeneration event.

3. The method as in claim 2 comprising the steps:
   wherein step (b) comprises the steps:
      (e) determining a power dissipated in the at least one coil,
      (f) determining a mechanical power at the shaft,
      (g) based on the dissipated power determined at step (e) and the mechanical power determined at step (f), determine a power on a bus between the power source and the at least one coil,
      (h) comparing the bus power determined at step (g) to a predetermined criteria indicating presence of regeneration electric current to the power source to generate the information indicating the presence of the regeneration event, and;
   wherein step (d) comprises shifting, a phase of the electric current on the at least one coil to introduce a d-axis component to the electric current on the at least one coil.

4. The method as in claim 1, wherein the second input comprises a signal indicating a request for dissipation of heat in the at least one coil.

5. A method of controlling an actuator having a stator, a shaft with a plurality of magnets, wherein the stator and the shaft move relative to each other at an interface between the stator and the shaft, so that the plurality of magnets provide a first magnetic flux that varies in magnitude and direction along the interface, at least one coil disposed on the stator with respect to the interface so that an electric current applied on the at least one coil provides a second magnetic flux that varies in magnitude and direction along the interface responsively to variations in the electric current, and a power source having a voltage, said method comprising the steps of:
   (a) applying the voltage across the at least one coil at a variable level;
   (b) determining a relative position between the stator and the shaft;
   (c) receiving by a controller a first input comprising a first signal indicating a request for a force to be output by the actuator;
   (d) receiving by the controller a second input comprising a second signal indicating a request to dissipate electrical power in the actuator;
   (e) controlling the variable level responsively to the relative position and the first signal to provide a q-axis component of the electric current on the at least one coil to vary the second magnetic flux; and
   (f) controlling the variable level responsively to the second signal to provide a d-axis component of the electric current on the at least one coil to vary the second magnetic flux, to dissipate electrical power in the actuator while substantially maintaining the requested force output of the actuator.

6. The method as in claim 5, wherein the second signal carries information indicating the presence of a regeneration event.

7. The method as in claim 6 comprising the steps:
   wherein step (d) comprises the steps:
      (g) determining a power dissipated in the at least one coil,
      (h) determining a mechanical power at the shaft, (i) based on the dissipated power determined at step (g) and the mechanical power determined at step (h), determine a power on a bus between the power source and the at least one coil, (j) comparing the bus power determined at step (i) to a predetermined criteria indicating presence of regeneration electric current to the power source to generate the information indicating the presence of the regeneration event.

8. The method as in claim 5, wherein the second input comprises a signal indicating a request for dissipation of heat in the at least one coil.

9. The method as in claim 8, comprising the step of storing a predetermined phase shift corresponding to a predetermined said d-axis component, and wherein step (f) comprises shifting, in response to receipt of the second signal, a phase of electric current on the at least one coil by the predetermined phase shift to introduce the predetermined d-axis component.

10. A plant in a vehicle and control system for actively suspending the plant in the vehicle, comprising:
a plant that varies in position with respect to the vehicle in response to a force determined by the control system;
an electrically commutated actuator comprising
a stator,
a shaft with a plurality of magnets, the stator and the shaft move relative to each other at an interface between the stator and the shaft,
wherein the plurality of magnets are disposed with respect to the interface so that the plurality of magnets provide a first magnetic flux that varies in magnitude and direction along the interface, and
at least one coil disposed on the stator with respect to the interface so that an electric current on the at least one coil provides a second magnetic flux that varies in magnitude and direction along the interface responsively to variations in the electric current,
wherein the shaft is in mechanical communication with the plant so that force is applied to the plant via the shaft;
a power source having a voltage;
a variable amplifier disposed electrically between the power source and the at least one coil, so that the amplifier applies the voltage across the at least one coil at a variable level;
a sensor disposed with respect to at least one of the stator and the shaft so that the sensor detects a relative position between the stator and the shaft, wherein the sensor outputs a signal corresponding to the relative position; and
a control circuit that
receives a first input comprising a first signal indicating a request for a force to be output by the actuator,
receives a second input comprising a second signal indicating a request to dissipate electrical power in the actuator,
receives the signal from the sensor,
controls the variable amplifier so that the variable level varies responsively to the relative position and the first signal to provide a q-axis component of the electric current on the at least one coil, and
controls the variable amplifier so that the variable level varies responsively to the second signal to provide a d-axis component of the electric current on the at least one coil.

11. The plant and control system as in claim 10, comprising a user-activatable switch that outputs a signal that comprises the second input and that indicates a request for dissipation of heat in the at least one coil.

12. The plant and control system as in claim 11, wherein the control circuit stores a predetermined phase shift corresponding to a predetermined d-axis component, and wherein the control circuit shifts, in response to receipt of the second signal, a phase of electric current on the at least one coil by the predetermined phase shift to introduce the predetermined d-axis component.

13. The plant and control system as in claim 10, comprising a sensor that detects environment temperature and when the detected environment temperature being below a predetermined value to output a signal that comprises the second input and that indicates a request for dissipation of heat in the at least one coil.

14. The plant and control system as in claim 10, comprising three said at least one coils arranged in a three-phase configuration.

15. The plant and control system as in claim 10, wherein the control circuit defines a maximum total current in the at least one coil, and wherein when an aggregate of the q-axis component and d-axis component exceeds the maximum total current, the control circuit reduces the d-axis component so that the aggregate does not exceed the maximum total current.

16. The plant and control system as in claim 10, wherein the second signal comprises information indicating the presence of a regeneration event.

17. The plant and control system as in claim 10, wherein
the control circuit comprises a processor configured to
determine a power dissipated in the at least one coil,
determine a mechanical power at the shaft,
based on the dissipated power and the mechanical power, determine a power on a bus between the battery and the at least one coil to generate an indicating signal, and
wherein the control circuit is configured to shift, when the indicating signal corresponding to the comparison indicates a regeneration electric current, a phase of electric current on the at least one coil to introduce the d-axis component.

18. An electrically commutated actuator and control system, comprising:
a stator;
a shaft that is movable with respect to the stator at an interface between the stator and the shaft;
a plurality of magnets movable with the shaft, wherein the plurality of magnets are disposed with respect to the interface so that the plurality of magnets provide a first magnetic flux that varies in magnitude and direction along the interface;
at least one coil disposed on the stator with respect to the interface so that an electric current on the at least one coil provides a second magnetic flux that varies in magnitude and direction along the interface responsively to variations in the electric current;
a variable amplifier that applies a varying electric current on the at least one coil that comprises a q-axis component and a d-axis component; and
a control circuit that defines the q-axis component in response to a first input comprising a first signal indicating a request for a force to be output by the actuator, and defines the d-axis component in response to a second input comprising a second signal indicating a request to dissipate electrical power in the actuator, variably with respect to the q-axis component, wherein the varying electric current is controlled in order to substantially maintain the requested force output of the actuator.

19. A plant in a vehicle and control system for actively suspending the plant in the vehicle, comprising:
   a plant that varies in position with respect to the vehicle in response to a force determined by the control system;
   an electrically commutated actuator comprising
      a stator,
      a shaft with a plurality of magnets, the stator and the shaft move relative to each other at an interface between the stator and the shaft,
      wherein the plurality of magnets are disposed with respect to the interface so that the plurality of magnets provide a first magnetic flux that varies in magnitude and direction along the interface, and
      at least one coil disposed on the stator with respect to the interface so that an electric current on the at least one coil provides a second magnetic flux that varies in magnitude and direction along the interface responsively to variations in the electric current;
      wherein the shaft is in mechanical communication with the plant so that force is applied via the shaft;
   a variable amplifier that applies a varying electric current on the at least one coil that comprises a q-axis component and a d-axis component; and
   a control circuit that defines the q-axis component in response to a first input comprising a first signal indicating a request for a force to be output by the actuator, and defines the d-axis component in response to a second input comprising a second signal indicating a request to dissipate electrical power in the actuator, variably with respect to the q-axis component.

* * * * *